US005872910A

United States Patent [19]
Kuslak et al.

[11] Patent Number: 5,872,910
[45] Date of Patent: Feb. 16, 1999

[54] PARITY-ERROR INJECTION SYSTEM FOR AN INSTRUCTION PROCESSOR

[75] Inventors: John Steven Kuslak, Blaine; Gary John Lucas, Pine Springs, both of Minn.; Nguyen Thai Tran, Mountain View, Calif.

[73] Assignee: Unisys Corporation, Blue Bell, Pa.

[21] Appl. No.: 777,221

[22] Filed: Dec. 27, 1996

[51] Int. Cl.[6] .................................................. G06F 11/00
[52] U.S. Cl. .............................. 395/183.17; 395/182.15; 395/568
[58] Field of Search .................... 395/183.17, 185.01, 395/185.02, 185.03, 182.13, 182.14, 182.15, 381, 382, 392, 395, 568; 371/3

[56] References Cited

U.S. PATENT DOCUMENTS

| | | | |
|---|---|---|---|
| 3,840,861 | 10/1974 | Amdahl et al. | 340/172.5 |
| 3,881,173 | 4/1975 | Larsen et al. | 340/172.5 |
| 4,538,265 | 8/1985 | Day et al. | 395/182.15 |
| 4,633,434 | 12/1986 | Scheuneman | 364/900 |
| 4,669,081 | 5/1987 | Matthews et al. | 371/3 |
| 4,670,876 | 6/1987 | Kirk | 371/3 |
| 4,759,019 | 7/1988 | Bentley et al. | 371/3 |
| 4,779,271 | 10/1988 | Suzuki | 371/3 |
| 4,794,517 | 12/1988 | Jones et al. | 364/200 |
| 4,835,459 | 5/1989 | Hamlin et al. | 324/73 R |
| 4,999,837 | 3/1991 | Reynolds et al. | 371/3 |
| 5,008,885 | 4/1991 | Huang et al. | 371/3 |
| 5,321,698 | 6/1994 | Nguyen et al. | 395/182.15 |
| 5,495,590 | 2/1996 | Comfort et al. | 395/375 |
| 5,564,014 | 10/1996 | Yamashita et al. | 395/182.15 |
| 5,671,352 | 9/1997 | Subrahmaniam et al. | 395/183.17 |
| 5,687,338 | 11/1997 | Boggs et al. | 395/381 |
| 5,701,409 | 12/1997 | Gates | 395/183.17 |

*Primary Examiner*—Joseph Palys
*Attorney, Agent, or Firm*—Beth L. McMahon; Charles A. Johnson; Mark T. Starr

[57] ABSTRACT

A system and method for selectively injecting parity errors into instructions after the instructions are fetched from a storage device and are resident within the instruction processor in a data processing system. The parity errors are selectively injected according to programmable indicators, each programmable indicator being associated with one or more instructions stored in the storage device. The error-injection system also includes programmable operating modes whereby error injection will occur after every fetch of an associated instruction, or alternatively, after alternate fetches of an associated instruction. The system allows for comprehensive testing of error detection and recovery logic in an instruction processor, and further allows for comprehensive testing of the logic associated with performing a data re-fetch from the storage device.

19 Claims, 10 Drawing Sheets

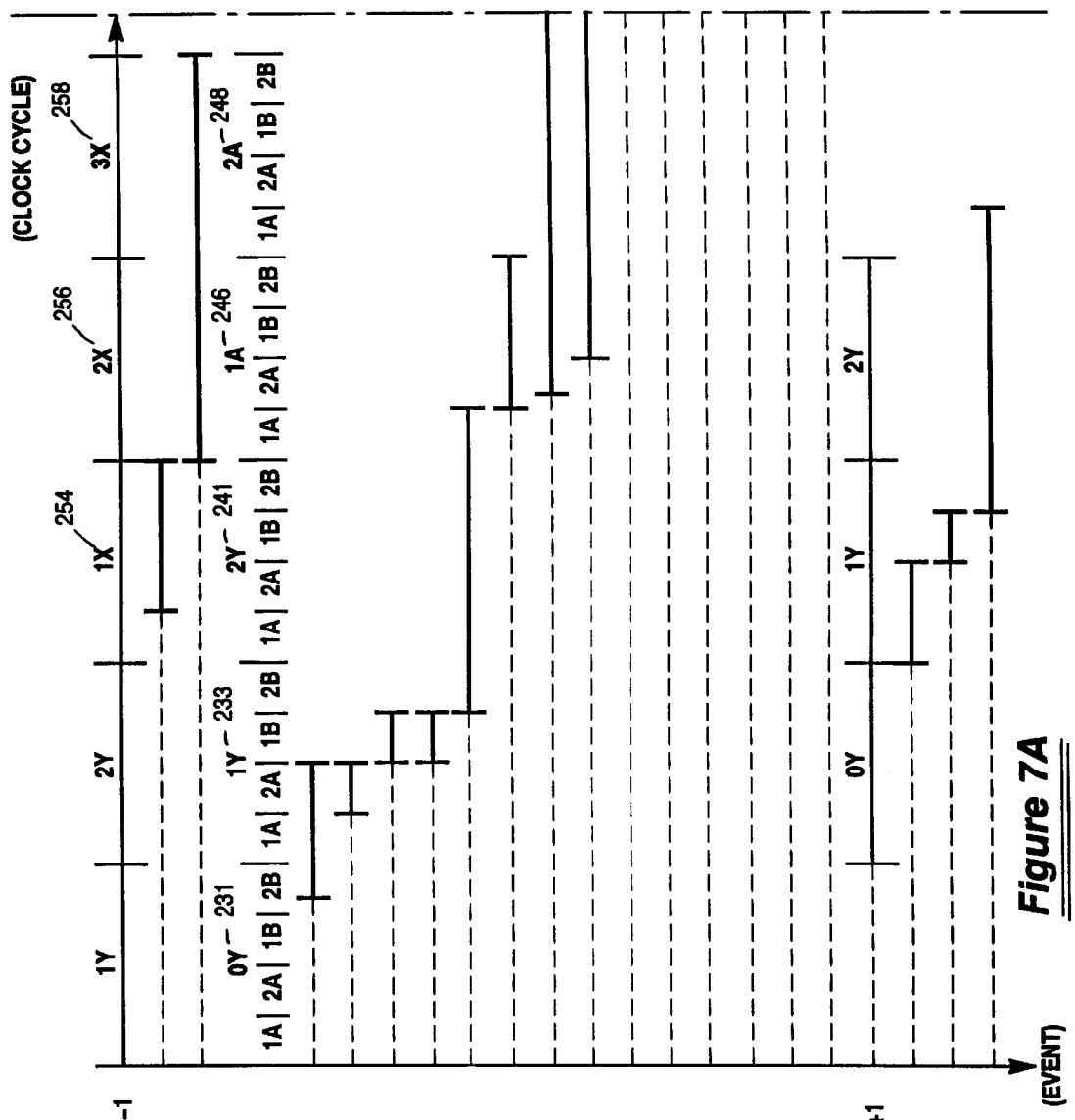

PARITY-ERROR INJECTION SYSTEM FOR AN INSTRUCTION PROCESSOR

CROSS REFERENCE TO CO-PENDING APPLICATIONS

The present application is related to co-pending U.S. patent application Ser. No. 08/777,214, filed Dec. 27, 1996, entitled "Programmable Processor Rate Controller", assigned to the assignee of the present invention and incorporated herein by reference.

BACKGROUND ART

1. Field of the Invention:

This invention relates to error injection methods and apparatus used in the testing of electronic data processing systems; and, more particularly, relates to the selective injection of parity errors into data resident within a data processor for testing of error detection and recovery systems.

2. Background Art:

In the past, errors have been injected into electronic circuits by probing circuit nodes to force connected circuitry to certain states indicative of errors. This can be done manually, or automatically. U.S. Pat. No. 4,759,019 to Bentley et al. discloses a programmable apparatus that injects errors by automatically short-circuiting voltage nodes within the system under test to ground or to a supply voltage in response to the system obtaining a particular state. U.S. Pat. No. 4,835,459 to Hamlin et al. describes a computer-controllable external device which, like the Bentley system, injects errors by applying voltage levels to pins or external circuit nodes of the unit under test. Error injection is triggered when a predetermined logic state exists on one or more of the externally-available circuit nodes.

Although straight-forward, the process of injecting errors by shorting circuit nodes can cause damage to circuits if voltage levels are not accurately applied. Moreover, this process is often not possible when highly integrated circuits are being tested, since most circuit nodes are not accessible to external probing devices. One common means of injecting errors into nodes that are not readily accessible involves the use of internal "scan-set" logic. Scan-set logic usually includes a group of internal state devices which are interconnected to one another to form a shift register called a "scan string". Internal circuit nodes can be forced to logic levels by shifting (scanning) data into the scan strings from a device input to simulate an error condition. Generally, this scan will be performed after the system clock has been stopped. After the scan string is initialized to a particular state indicative of an error condition, the system clock is re-started. The injected error condition exercises the error detection and recovery logic.

Several complications exist with using scan strings to inject errors. Prior to injecting most errors using scan strings, the system clock must be halted as discussed above. This must be done at a precise time, so that the circuit is in the same logic state that would exist prior to a particular error occurrence during normal circuit operation. Stopping the clock so that the logic is in an exact state is difficult. Generally, it involves stopping the clock sometime before the logic is in the required state, then issuing single clock pulses until the logic is in the precise state. Calculating the required clock control, then administering that control during circuit test, is time-consuming and error-prone.

Moreover, this process must be repeated for every error injected.

The above-described problems are accentuated when testing very complex circuits such as those associated with pipelined instruction processors. More specifically, testing parity-error detection and recovery logic in pipelined instruction processors has been particularly problematic in prior art systems for several reasons. In pipelined instruction processors, several instructions are in various stages of execution within the instruction processor at one time. If a parity error is detected on an instruction within the instruction processor, the instruction processor completes execution of all foregoing uncompleted instructions in the instruction stream, that is, the pipelined instruction processor is "de-piped". After the instruction processor is de-piped, the instruction which was corrupted is re-fetched from memory. Both the de-pipe and re-fetch processes require very complex logic sequences to perform. These sequences are dependent not only on the type of instructions which are resident in the pipeline at the time of the error, but also on the relative memory address of the re-fetched instruction. Completely testing the error-detection and recovery logic requires the execution of hundreds of error injection test cases. Performing this testing using the scan-set and associated clock control operations described above is very time-consuming. As a result, prior art systems required lengthy test schedules that are no longer feasible considering the short design cycles associated with modern-day development efforts.

SUMMARY OF THE INVENTION

According to the present invention, a system is provided for automatically injecting parity errors into instruction signals that are resident within an instruction processor of a data processing system.

In the preferred embodiment, the instruction processor utilizing the current invention is pipelined. Within the instruction processor, several instructions may be in various stages of execution at any given time. A parity error detected on a target instruction fetched from memory causes the instruction processor to complete execution of any other uncompleted instructions resident within the instruction processor pipeline before re-fetching the target instruction from memory. This is called "de-piping" the instruction processor pipeline. The sequences required to de-pipe the instruction processor, and to re-fetch the instruction from memory will vary based on the type of instructions present in the pipeline at the time the error occurred, and on the relative location of the target instruction within a predetermined block of storage in memory. The disclosed parity error injection mechanism provides a system that allows errors to be selectively injected into the instruction stream so that all error-recovery sequences may be fully tested at full system clock speeds.

The current invention allows parity errors to be selectively injected based on indicators which may be programmed using a scanable interface. Each indicator specifies one or more target addresses within the memory. The user programs the indicators to specify the target addresses based on predetermined test criteria such as the type of instructions stored at the target addresses, and/or the relative position of the target addresses within the memory. This allows the user to tailor parity error injection tests to obtain specific test coverage.

After the user has initialized the programmable indicators to obtain the desired test cover, the instruction processor is allowed to begin instruction execution. Instruction signals stored at the target addresses will be injected with parity errors after being fetched by the instruction processor. This injection must be accomplished after the instructions are resident within the instruction processor because error-correction mechanisms prevent the error injection from being performed on instructions which are still resident within the memory.

The parity error injection system allows for several modes of operation. In a first mode, parity errors are only injected on the target addresses during initial instruction fetches. On subsequent re-fetches, no injection occurs. In a second mode, parity errors are injected both on the initial instruction fetches, and on the resulting re-fetches, thereby causing "double-faults" which result in memory degradation for the memory blocks containing the target addresses. In still another "single-shot" mode, errors are injected on only the first occurrence of a fetch from memory following initialization of the error-injection system. The various operating modes of the invention allow for complete test coverage of the many hardware sequences associated with parity error detection and recovery in a pipelined instruction processor.

OBJECTS

It is the primary object of the invention to provide an improved parity-error injection system for injecting errors into instructions that are resident within the instruction processor of a data processing system.

It is a further object of the invention to provide an improved parity-error injection system for injecting predetermined errors into instructions resident within a pipelined instruction processor of a data processing system.

It is another object of the invention to provide a parity-error injection system capable of selectively continuously injecting errors into the instruction stream during full-speed operation of the instruction processor.

It is yet another object of the invention to provide a parity-error injection system capable of selectively injecting errors into the instruction stream based on user-supplied data.

It is still another object of the invention to provide a parity-error injection system that does not require user intervention following system initialization.

It is yet another object of the invention to provide a parity-error injection system capable of selectively exercising the cache re-fetch sequence logic for each word of memory residing within a predetermined block of memory.

It is still another object of the invention to provide a parity-error injection system which makes it feasible to exercise the error-recovery logic for all possible combinations of instructions which may be resident within the instruction pipeline during the occurrence of a parity error.

It is another object of the invention to provide a parity-error injection system capable of exercising the logic sequences performed after a block of memory has experienced a double memory fault.

It is a further object of the invention to provide a parity-error injection system capable of injecting one-time occurrences of selected parity errors.

Other more detailed objectives of the invention will become apparent to those skilled in the art from a consideration of the Drawings and the Detailed Description of the Preferred Embodiment.

BRIEF DESCRIPTION OF THE DRAWINGS

FIG. 7A and 7B, when arranged as shown in FIG. 7, are a timing diagram illustrating an instruction re-fetch after the detection of an instruction parity error.

DESCRIPTION OF THE PREFERRED EMBODIMENT

A. System Environment

Figure 1:
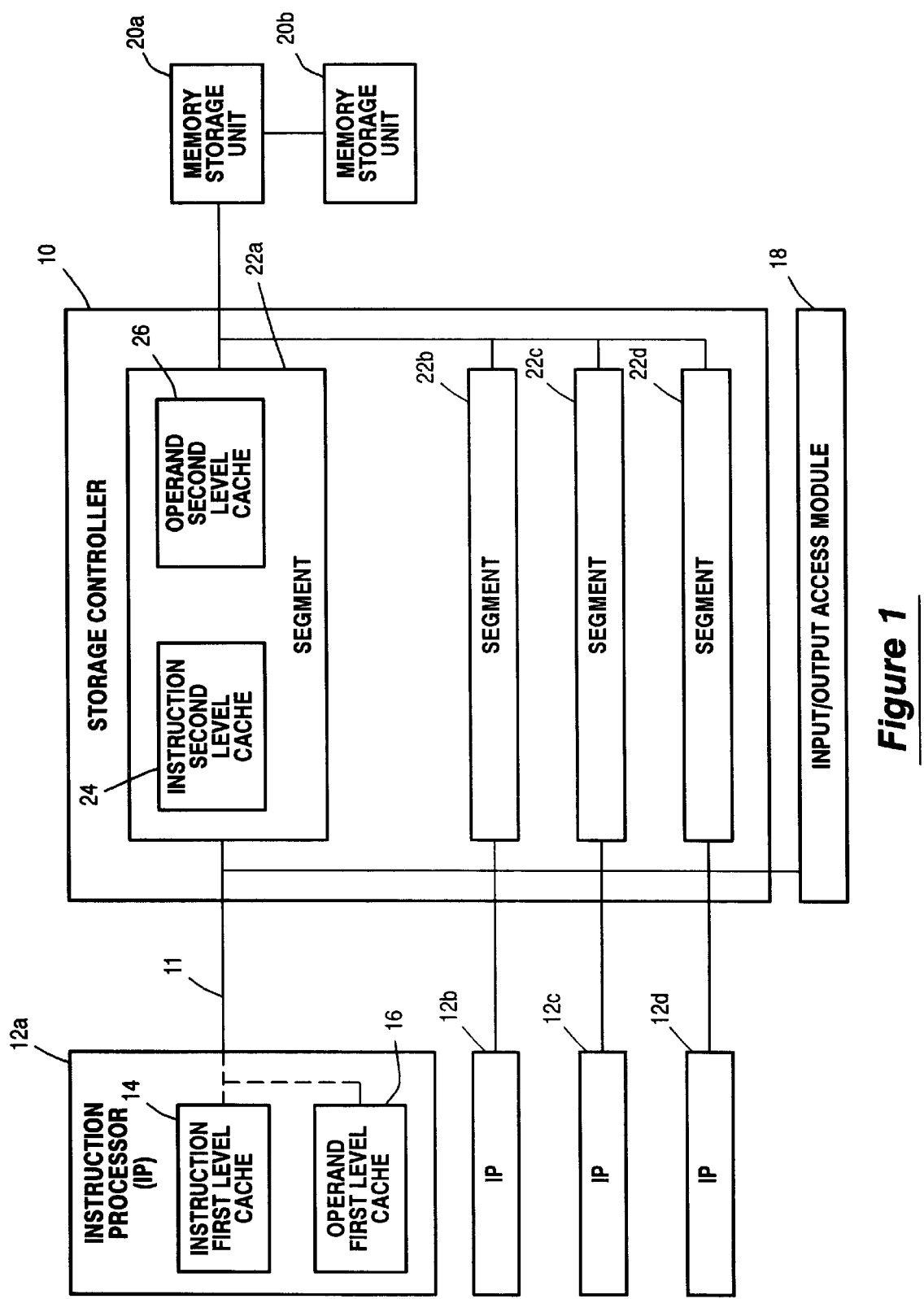
FIG. 1 is a block diagram of a data processing system utilizing the present invention.

FIG. 1 is a block diagram of a data processing system utilizing the present invention. The digital data processing system in which the invention can be utilized is modular, and provides for parallel processing of machine instructions. The system utilizes a Storage Controller (SC) 10 with each SC being directly connected via interface 11 to between one and four local Instruction Processors (IPs) illustratively shown as 12a, 12b, 12c, and 12d. Each IP has a first-level instruction cache (I-FLC) 14, and a first-level operand cache (O-FLC) 16. The IPs 12a, 12b, 12c, and 12d are the instruction execution units of the system, and provide basic mode and extended mode instruction execution. Each IP fetches instructions from memory, executes the instructions, and stores the results back into memory. The specific operation of the IPs will be described in more detail below.

The SC is further connected to an Input/Output (I/O) Access Module, 18, which provides the system interface to input/output channels which support peripheral equipment (not shown.) Finally, the SC is connected to one or two local Main Storage Units (MSUs) illustratively shown as 20a and 20b, which contain the system main memory. The SC 10 has either two or four cache memory segments shown as 22a, 22b, 22c, and 22d. Each cache memory segment has a second-level instruction cache (I-SLC) 24 and a second-level operand cache (O-SLC) 26.

Figure 2:
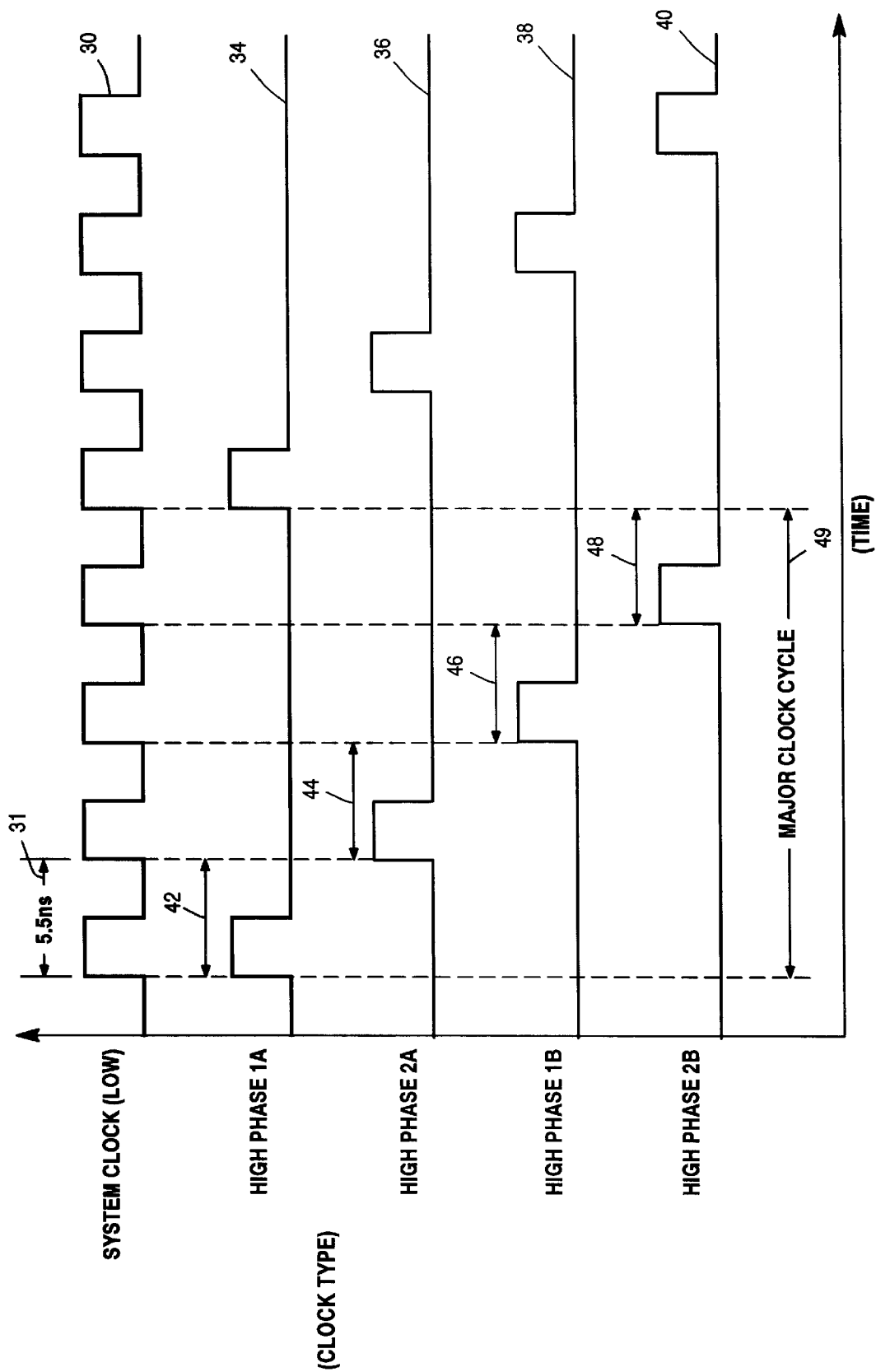
FIG. 2 is a timing diagram illustrating the clock signals associated with the instruction processor logic.

FIG. 2 is a timing diagram illustrating the clock signals associated with the IP logic. The system clock 30, which has a period 31 of about 5.5 nanoseconds (ns), is used to generate all other clock signals in the system using a clock-generation scheme which is well-known to those skilled in the art. Four of the clock signals used within the IP logic are labeled High Phase 1A, 34, High Phase 2A, 36, High Phase 1B, 38, and High Phase 2B, 40. The system clock periods associated with the high clock pulse of High Phase 1A, High Phase 2A, High Phase 1B and High Phase 2B can be referred to as Phase 1A, 42, Phase 2A, 44, Phase 1B, 46, and Phase 2B, 48, respectively. The time between two rising edges of the High Phase 1A Clock 34 is called a major clock cycle 49, which is approximately 22 ns long.

The instruction processor of the preferred embodiment uses instruction pipelining to increase system throughput. This means that the execution of each instruction is divided into functional operations which can be performed within different areas of the IP. Since each functional area of the IP can be processing somewhat independently from the other functional areas, the IP can be executing portions of several instructions at one time so that instruction execution is overlapped.

In the preferred embodiment, the data processing system utilizing the present invention divides a standard instruction into three functional operations. Each operation requires one major clock cycle 49, also called a "stage", to execute. During the first stage, the machine instruction is decoded and the addresses of any needed operands are generated. In the second stage, any needed operands are fetched from memory. During the third stage, the operation defined by the instruction is performed and the results are stored in memory. When the IP is operating in full pipelined mode, one instruction completes execution every major clock cycle 49.

Figure 3:
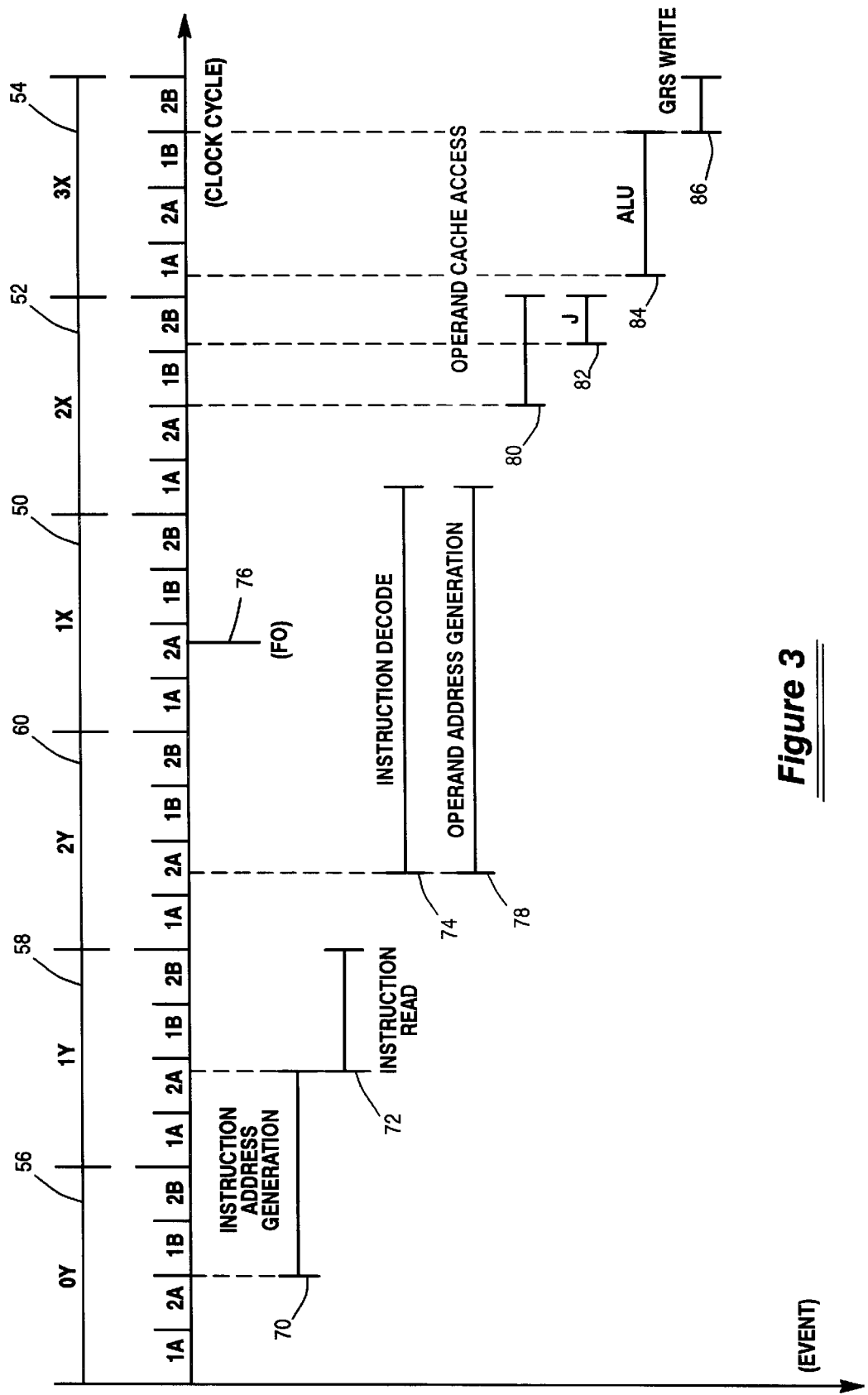
FIG. 3 is a timing sequence diagram illustrating the sequencing of a standard instruction through the instruction pipeline.

FIG. 3 is a timing sequence diagram illustrating the sequencing of a standard instruction through the instruction pipeline. The three execution stages described above are labeled 1X, 50, 2X 52, and 3x, 54. Prior to instruction execution, three additional major cycles are required to perform address generation, read the instruction from memory, and begin instruction decode. These instruction fetch stages are labeled 0Y, 56, 1Y, 58, and 2Y, 60.

FIG. 3 shows the movement of a standard instruction through the pipeline. During stages 0Y 56 and 1Y 58, instruction address generation occurs, as indicated by line 70. During phase 2A of stage 1Y 58, the instruction address is presented to the instruction cache. Eight instructions are then read from cache during the latter half of stage 1Y, as shown by line 72. The cache hit lines are valid at the phase 1Y1B, indicating whether a cache hit occurred. If the instruction was not available within the first-level cache 14, the IP suspends operation and initiates an instruction fetch to the second-level instruction cache 24. If the instruction was available within the first-level cache 14, however, the hit lines select one of the eight instructions for execution. The selected instruction is latched at 2Y2A, and decode begins, as shown by line 74.

The instruction register, F0, is loaded during the 1X2A phase at time 76. Operand address generation 78 also occurs during the 1X stage 50. During the 2X stage 52, the operand and the General Register Set (GRS) data are fetched, as shown by line 80. Late in the 2X stage 52, Per J shifting 82, (or "J") is done to determine whether the entire operand has been fetched. In the 3X stage 54, the Arithmetic Logic Unit (ALU) receives the operand and GRS data for processing, as shown by line 84. Finally, late in the 3X stage 54, results are written to GRS, as illustrated by line 86.

Figure 4:
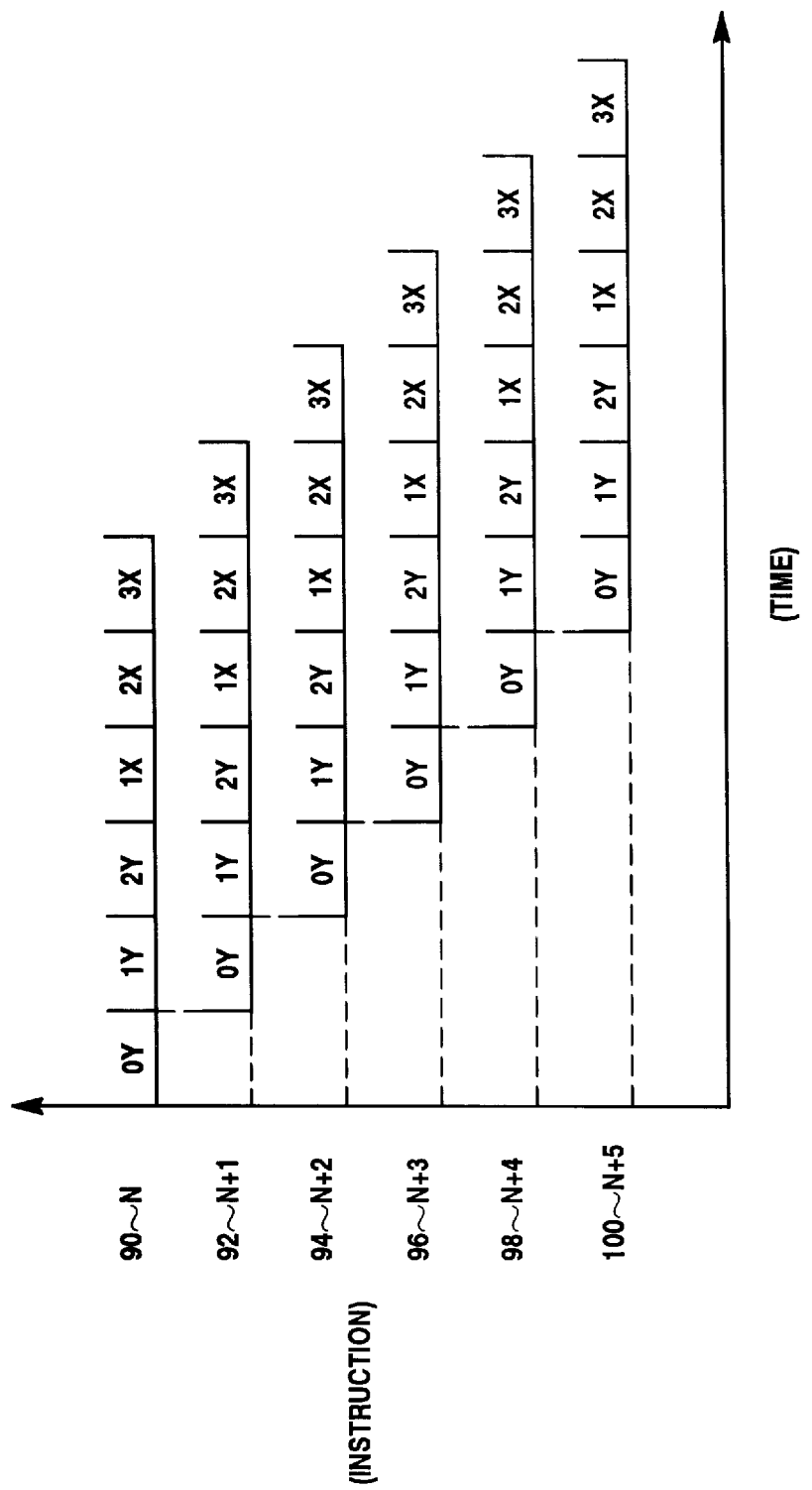
FIG. 4 is a timing diagram illustrating the pipeline instruction overlap of six consecutive standard instructions, N through N+5.

FIG. 4 is a timing diagram illustrating the pipeline instruction overlap of six consecutive standard instructions, N through N+5, labeled 90, 92, 94, 96, 98 and 100 respectively. The diagram represents fully overlapped execution for the three stages of instruction fetch 0Y, 1Y, and 2Y, and the three stages of instruction execution 1X 2X, and 3X. As stated above, during fully overlapped operation, one instruction completes every major cycle, or approximately 22.2 ns.

The above-described instruction execution cycles, 1X, 2X and 3X represent the major cycles during which standard instructions can be executed. Other non-standard, or extended-cycle, instructions require more than three execution cycles to complete. For these extended-cycle instructions, instruction pipelining is suspended by delaying the load of the next instruction into the instruction register, F0. The processing of extended-cycle instructions is not related to the operation of the current invention, and will not be discussed further. For more information on extended-cycle execution, see the co-pending application entitled "Programmable Processor Rate Controller", Ser. No. 08/777,214, filed on Dec. 27, 1996, which is commonly assigned to the assignee of this invention, and which is incorporated herein by this reference.

Figure 5:
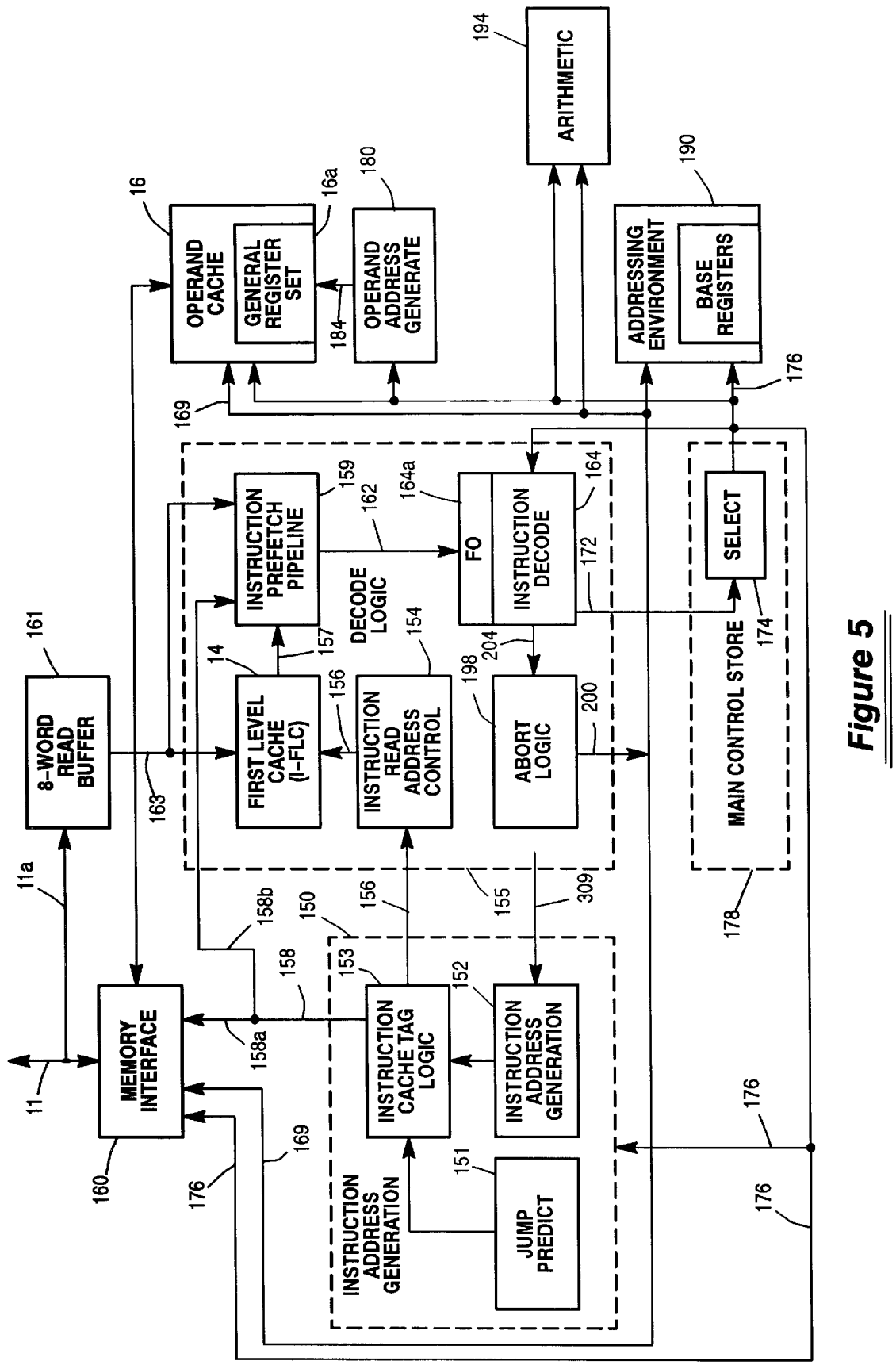
FIG. 5 is a block diagram of the major sections of an instruction processor utilizing the current invention.

FIG. 5 is a block diagram of the major sections of an IP. Although this diagram does not provide a complete view of all data, address, and control paths, a subset of these paths is shown to facilitate an understanding of how the various IP sections interact, and to provide background information necessary to the understanding of the error injection system of the preferred embodiment.

An IP consists of multiple sections. An instruction address generate section 150 includes logic which generates an absolute instruction address by adding a relative address to the address of a designated base register. A jump predict subsection 151, and an instruction address generation subsection 152, provide absolute addresses to the instruction cache tag logic 153. The instruction cache tag logic 153 transfers the address to the instruction read address control logic 154, which resides in the instruction decode section 155, via interface 156. The instruction read address control logic 154 provides the address to the IP first-level instruction cache (1-FLC) 14 on address path 156. The address is used to retrieve eight instructions from each of the eight memory blocks (not shown) of the I-FLC 14. These eight instructions are transferred to the instruction pre-fetch logic over lines 157 where they begin encode within the instruction pre-fetch pipeline 159.

During stage 1Y, the instruction cache tag logic 153 indicates whether a cache hit occurred via interface lines 158b. If a cache miss occurred, the IP suspends execution. Lines 158a communicate the miss to the IP memory interface 160, which initiates a memory request to the storage controller 10 via interface 11.

The storage controller (SC) 10 provides the interface to the second-level cache segments, which contain the second-level instruction cache (I-SLC) 24. The SC further provides an interface to the appropriate memory storage unit (MSU) 20a or 20b, which will be accessed if the instruction is not resident in the I-SLC 24. When the instruction is returned from either the I-SLC 24 or a MSU 20a or 20b, it is included in an eight-word block of instructions and provided on data path 11a to an eight-word read buffer 161. The read buffer 161 latches the eight-word block at phase 1Y1B, then forwards the block over lines 163 to the I-FLC 14 where it is cached. The eight-word block is also forwarded to the instruction pre-fetch pipeline 159 so that instruction decode can begin.

After the block of eight instructions is resident within the instruction pre-fetch pipeline 159, interface lines 158b select one of the eight instructions as the current instruction. The selected instruction is latched within the instruction pre-fetch pipeline 159 during phase 2A of stage 2Y, so that decode can begin within the instruction decode subsection 164 during the second half of stage 2Y. The selected instruction is loaded over lines 162 into the instruction register F0 164a and latched during phase 2A of stage 1X. Decode continues during the 1X stage.

The instruction decode subsection 164 generates hardware control signals 172 which are provided to a selector 174. During standard instruction execution, the hardware control signals 172 are selected by the selector 174 and provided as control signals 176 to all other sections of the instruction processor 12. During extended-cycle instruction execution, the control signals on lines 176 are provided by the main control store section 178. Since an understanding of extended-cycle instruction execution is not essential to the disclosure of the current invention, the generation of control signals by the main control store section 178 will not be discussed further.

As stated above, the control signals 176 are provided to all sections of the logic, including the instruction address generation 150, the operand address generate 180, the operand cache 16, the addressing environment 190, and the arithmetic section 194 at the end of stage 1X. Generally, these sections latch respective ones of the control signals 176 during phase 2X1A. The latched control signals then initiate hardware and microcode-controlled sequences that accomplish instruction execution during the 2X and 3X stages.

Sometimes, events re-direct or temporarily suspend instruction execution. Such events include interrupts, SKIP instructions, or parity errors. When these conditions occur, the abort logic section 198 generates an abort signal 200 which is provided to all other sections of the logic. The abort signal 200 prevents the control signals 176 from being latched into the IP logic sections, and thereby prevents instruction execution from continuing. Instruction execution does not resume until the abort signal 200 is driven inactive, as will be described further below.

B. Parity Errors in a Pipelined Instruction Processor

Figure 6:
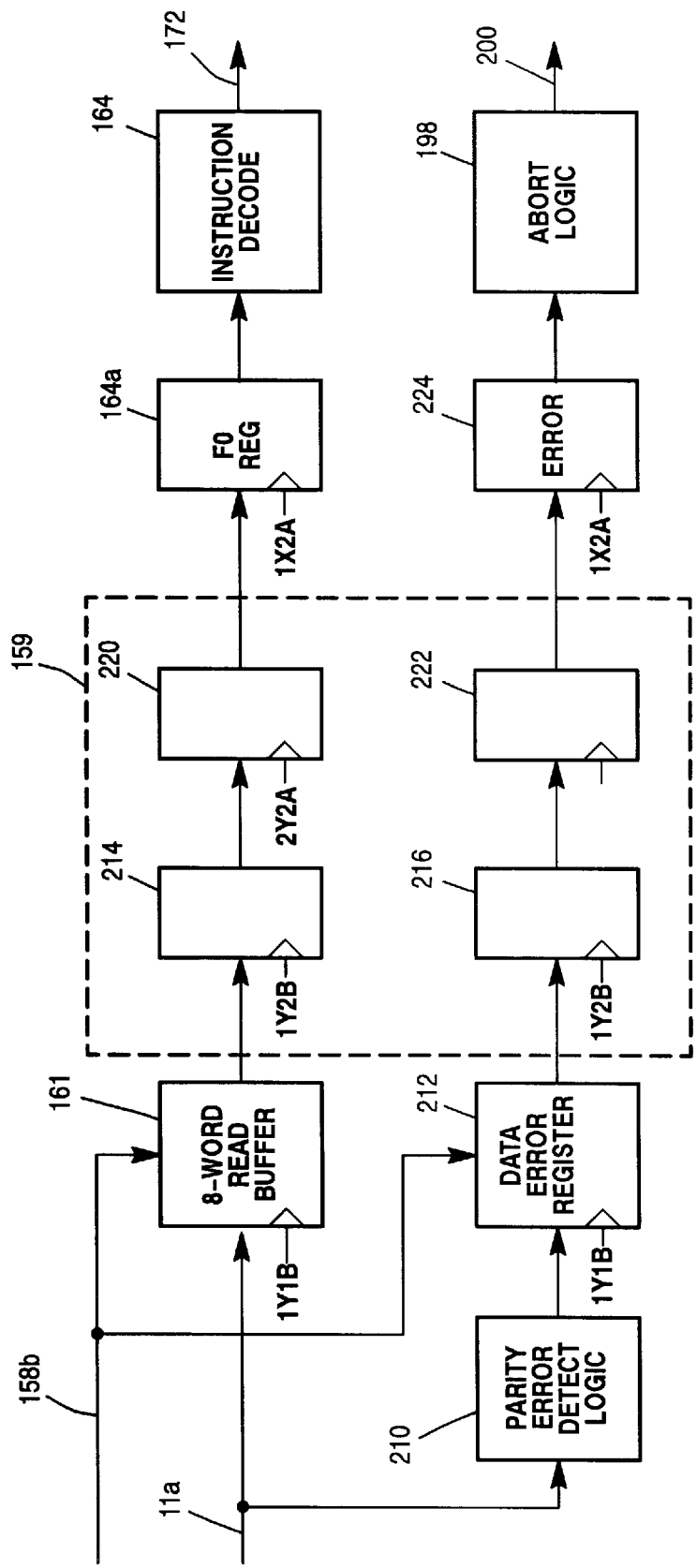
FIG. 6 is a diagram of the instruction read buffer and associated logic for detecting parity errors.

FIG. 6 is a diagram of the instruction read buffer, and includes the logic for detecting parity errors. As mentioned above, an instruction parity error is one of the error conditions that causes the abort signal 200 to be generated. Parity errors are detected after a block of eight one-word instructions are read from the SC 10. The block of instructions is provided from the SC 10 to parity-error detect logic 210 on data path 11a. The instruction block is latched into the eight-word read buffer 161 at phase 1Y1B. Also at phase 1Y1B, parity error data is latched into the error register 212. Each one-word instruction within the eight-word read buffer 161 is associated with a bit in the error register 212. When a parity error is detected on one of the instructions, the associated bit in the error register 212 is set.

After the instruction block and the associated parity error data is latched into the eight-word read buffer 161 and the error register 212, respectively, the interface lines 158b from the instruction cache tag logic 153 selects one of the eight instructions as the current instruction. At phase 1Y2B, the selected instruction is latched into the 1Y2B pipeline register 214 within the instruction pre-fetch pipeline 159. The corresponding error bit is also latched into the 1Y2B data register 216 during phase 1Y2B. At 2Y2A, the selected instruction and corresponding error bit is re-latched into the 2Y2A pipeline register 220 and 2Y2A register 222, respectively. At 1X2A, the instruction is latched into the instruction register 164a, where it is provided to the instruction decode section 164 which generates the hardware control signals 172. Also at 1X2A, the corresponding error bit is latched into the 1X2A error register 224, and provided to the abort logic section 198. If the error bit indicates that the associated instruction has a parity error, the abort logic section 198 generates the abort signal 200, which blocks the hardware control signals 172. When an abort signal is issued as the result of an instruction parity error, instruction execution is suspended and the instruction is re-fetched from the SC.

Figure 7B:
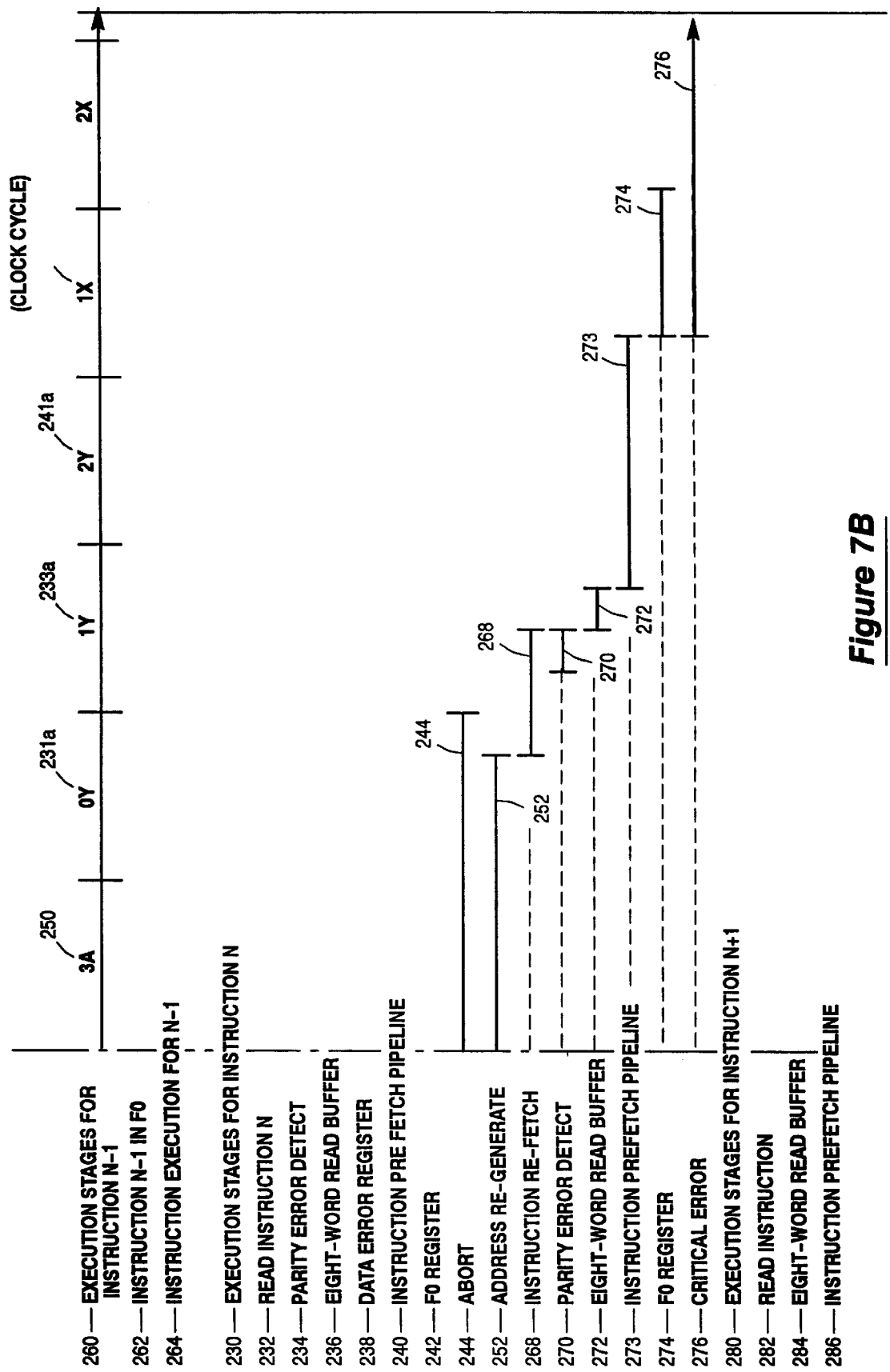

FIG. 7A and 7B, when arranged as shown in FIG. 7, are a timing diagram illustrating an instruction re-fetch after the detection of an instruction parity error. Line 230 shows the execution stages for instruction N. During phase 2B of stage 0Y 231, instruction N is read from the SC 10 into the eight-word read buffer 161, as shown on line 232. During phase 2A of stage 1Y 233, parity error detection is performed on the eight instructions read from the SC 10, as shown on line 234. The resulting parity error flags are latched into the error register 212 and the eight instruction words are latched into the eight-word read buffer 161 at phase 1Y1B, as shown on lines 236 and 238, respectively. At phase 1Y2B, the current instruction is selected from the eight-word read buffer 161 and latched into 1Y2B pipeline register 214, and the corresponding error bit is latched into the 1Y2B error register 216, as illustrated by line 240. Instruction N remains in the instruction pre-fetch pipeline 159 throughout stage 2Y 241 until phase 1X2A, when the current instruction is latched into the F0 register 164a, as shown by line 242. During phase 1X2A, the abort signal 200 goes active if a parity error is associated with the instruction resident in the F0 register, as illustrated by line 244.

If the abort signal 200 is driven active because of a parity error, the hardware control signals generated by the instruction decode logic 164 are not latched by the various IP logic sections. The 1X stage of execution is an aborted stage which can be referred to as stage 1A 246. During this stage, the abort signal and associated status bits are provided to the instruction address generation section 150. The instruction address generation section 150 must reconstruct the address for instruction N in preparation for re-fetching this instruction from the SC 10. This address generation requires three full stages, labeled 1A 246, 2A 248, and 3A 250, as shown by line 252.

During stages 1A 246, and 2A 248 for instruction N, the execution of the previous instruction N-1 continues. As mentioned above, because of the pipelined overlapping of instruction execution, stages 1X 254, 2X 256, and 3X 258 for instruction N-1 correspond to stages 2Y 241, 1A 246, and 2A 248, respectively of instruction N, as shown by line 260. Instruction N-1 is latched into the F0 register 164a during stage 1X 254 for instruction N-1, as shown by line 262. The resulting control signals 176 for instruction N-1 are latched into the various IP sections to initiate sequence execution at the same time as instruction N is latched into the F0 register. Instruction execution for instruction N-1 is unaffected by the generation of the abort signal 200 for instruction N, and continues to completion, as illustrated by line 264.

For instruction N, the stages which follow stage 3A 250 can be thought of as a repeat of the earlier stages 0Y 231, 1Y 233, and 2Y 241, and are therefore labeled 0Y 231a, 1Y 233a, and 2Y 241a, respectively. During stage 0Y 231a, the re-constructed address for instruction N has been provided to the SC 10 and the instruction is re-fetched from memory, as shown on line 268. Parity-error detection is performed during phase 2A of stage 1Y 233a, as illustrated by line 270. The re-fetched instruction and the corresponding error indicator are latched into the eight-word read buffer 161 and the error register 212, respectively, as shown on line 272. At phase 1Y2B, the instruction is selected from the read buffer 161 and latched into 1Y2B pipeline register 214, and the corresponding data error bit is latched into the 1Y2B error register 216 as illustrated by line 273. Instruction N is latched into the F0 register 164a during phase 1X2A for decode as shown by line 274. If a parity error is again present in instruction N, the critical error signal is driven active by the abort logic 200 as indicated by line 276. The critical error signal will result in degradation of the SC segment containing instruction N, so that the segment will no longer be used until maintenance is performed.

FIG. 7A and 7B also show how instruction N+1 is affected by a parity error in instruction N. Line 280 shows the execution stages for instruction N+1. Instruction N+1 has been read from memory, latched into the eight-word read buffer 161, and latched into the instruction pre-fetch pipeline 159 at the time the abort signal 200 goes active for instruction N, as shown by lines 282, 284, and 286, respectively. The data in the eight-word read buffer and the pre-fetch pipeline must therefore be discarded when a parity error occurs for instruction N.

By the time the corrupted instruction (illustratively shown an instruction N in this example) is latched into the instruction register F0 164a, instruction N+2 is being fetched, and the address for instruction N is no longer available within the instruction address generation section 150. To reconstruct this address, the logic must take into account the type of instructions which follow instruction N in the instruction stream.

After the address for instruction N has been reconstructed, the re-fetch sequences are initiated by the SC 10. These re-fetch sequences vary depending on the relative position of the target instruction within an eight-word memory block, and on the operation being performed by the SC at the time the re-fetch request is made.

Finally, the instruction preceding the corrupted instruction must be allowed to complete without being affected by the abortion. Testing every instruction type to ensure that this is indeed the case involves hundreds of test scenarios.

In sum, the complexities of pipelined instruction processors necessitate that hundreds of parity errors be injected to fully test the parity error recovery logic. In prior art instruction processors, parity error injection of the type utilized by this invention is an insurmountable task for several reasons. First, generally errors can not be injected into second-level cache memories since the error correction schemes employed by these memories remove parity errors from the corrupted instructions before the instructions are provided to the instruction processors. Therefore, parity-error injection must be accomplished by stopping the instruction processor clock just prior to an instruction fetch. By single-stepping the clock a requisite number of clock pulses, the target instruction can be gated into the instruction pipeline. Scan logic is employed to inject the parity error into the instruction pipeline, and the clock is re-started.

The process of stepping the clock to gate the instruction into the pipeline is very error-prone. The number of clock pulses needed to perform the gating is unique for each instruction and must be calculated by using logic timing diagrams. If the calculation is performed incorrectly, unpredictable test results are received. Moreover, since this technique involves stopping the clock, multiple-error conditions can not be injected at full speed. As a result, run-time conditions can not be adequately simulated.

C. Parity Error Injection

Figure 8A:
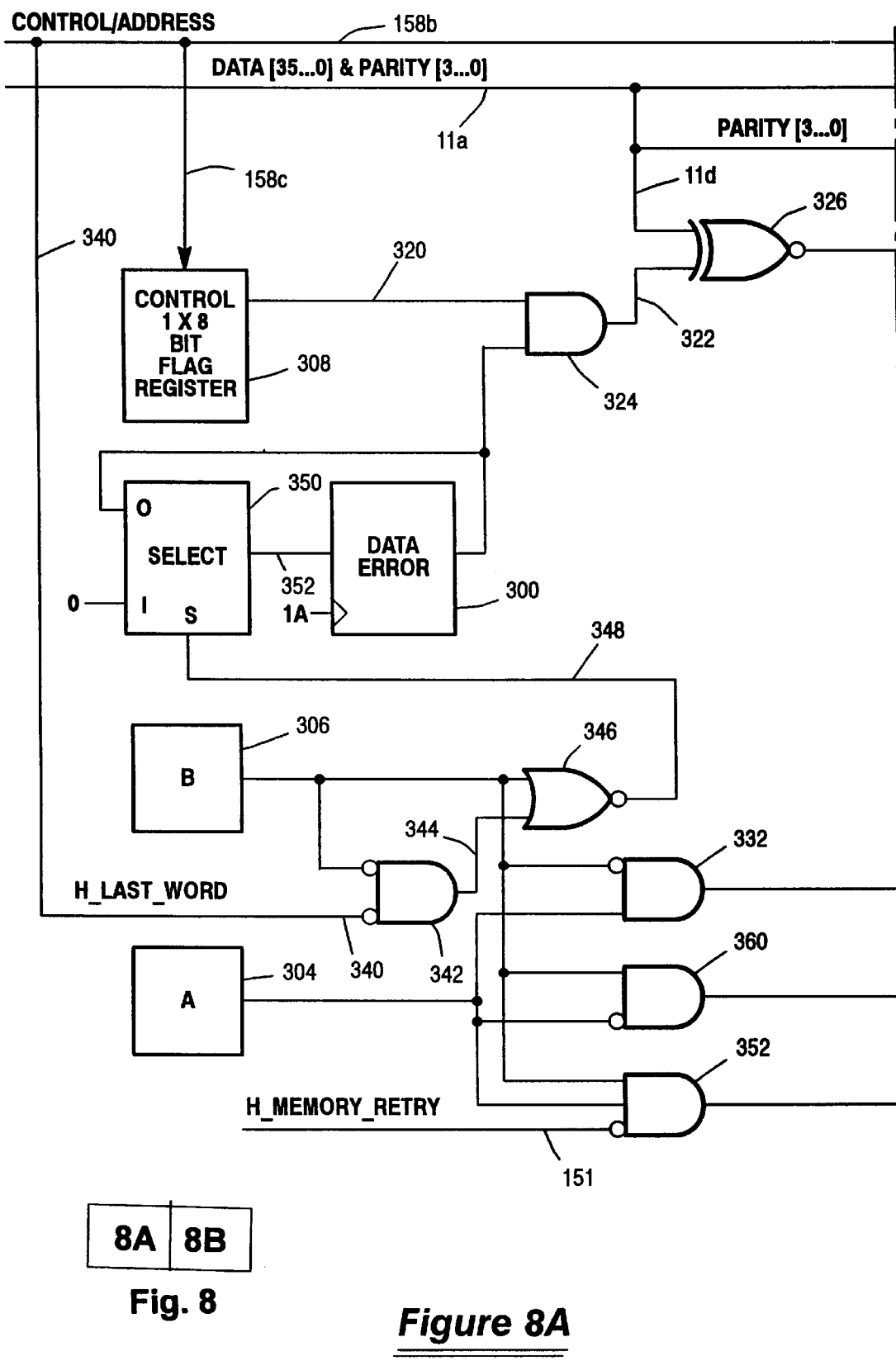
FIG. 8A and 8B, when arranged as shown in FIG. 8, are a logic diagram of the parity error injection system.
Figure 8B:
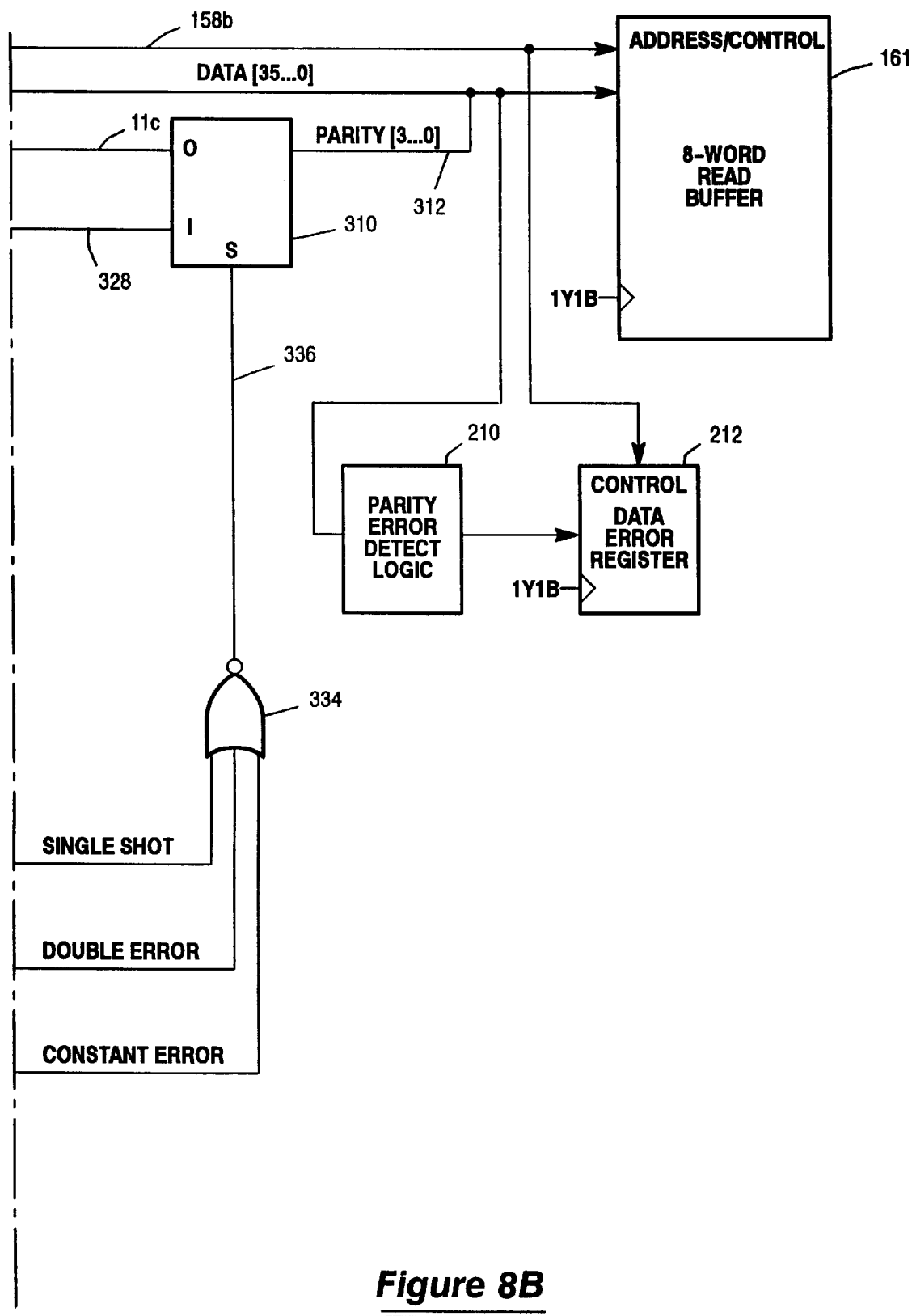

FIG. 8A and FIG. 8B, when arranged as shown in FIG. 8, are a logic diagram of the parity error injection system. This system provides a means of selectively injecting errors into the instruction stream without stopping the clock. Since no single-stepping calculations or manual intervention is required, parity-error recovery logic can be tested in a fraction of the time required to perform that task in prior art systems.

Parity error injection is controlled by the error latch 300, two control latches A 304 and B 306, and the flag register 308. These state devices may be set and cleared using a scan interface which is well-known in the art. Once these state devices have been initialized to a desired value, they are transparent to the normal operations of the instruction processor (except, of course, that parity errors will be injected at selected intervals within the instruction stream.)

The error latch 300 must be set for error injection to take place. When the error latch 300 is set, a parity error will be injected in selected ones of the instructions during the next fetch of an eight-word block of instructions from the SC 10 after a first-level cache miss. The instructions to be corrupted are selected using the flag register 308. The flag register 308 contains eight bits, with each bit corresponding to a different associated one of the one-word instructions within the eight-word block. When the corresponding bit of the flag register is set, the associated instruction will be corrupted as it is read from the SC 10 onto data path 11a.

Control latches A 304 and B 306 control the mode of parity error injection. Parity error injection can be performed in "single-shot" mode, "constant" mode, or "double-error" mode. In single-shot mode, one or more parity errors are injected during an eight-word instruction fetch, and then the data error state latch clears so that any further error injection requires another scan of the parity-error injection logic. In constant mode, one or more parity errors are injected on alternate instruction block fetches from the SC 10. By limiting error-injection to alternate instruction blocks, the re-fetch cycles are allowed to complete successfully so that instruction execution can continue without inducing a critical error. Finally, in double-error mode, errors are injected every cycle. This results in one or more errors being injected not only on an initial fetch of an instruction block, but also on the re-fetch of the instruction block. As discussed above, this causes a critical error, which results in degradation of the memory segment containing the corrupted instruction.

FIG. 8A and 8B, when arranged as shown in FIG. 8, is a logic diagram of the parity error injection system. Before describing the logic associated with the various modes of error injection, the operation of the circuit illustrated in FIG. 8A and FIG. 8B should be described in relation to normal instruction fetches. During a normal block fetch, eight 36-bit instructions are read from the SC 10 onto the path 11a, and latched into the eight-word read buffer 161 during phase 1Y1B. Each instruction is associated with four parity bits which are also read from the SC 10 onto the path 11a. These bits are provided on path 11c to a selector 310. During normal circuit operations when neither control latch A 304 nor control latch B 306 is set, the parity bits on the 0-input of the selector 310 are selected to be provided to path 312, and are latched into the eight-word read buffer 161 with the associated instruction word. In addition, the instruction and parity bits are provided to the parity error detect logic 210. If a parity error is detected on the instruction word, an associated error bit is set in the error register 212, as described above. This parity error bit will cause the abort signal 200 to activate after the associated instruction is latched in the F0 register 164a at phase 1X2A.

As mentioned above, during operation in any of the parity-inject modes, the error latch 300 is set, with control latches A 304 and B 306 selecting the mode. In single-shot mode, latch A 304 is set, and latch B 306 is clear. During an eight-word instruction fetch, as each instruction is present on path 11a, selected ones of the interface lines 158b on path 158c gate the corresponding flag bit from the flag register 308 onto the flag path 320. If the flag bit gated onto path 320 is set, the error inject signal 322 is driven high by AND gate 324. The parity bits associated with the instruction are provided to the XOR gate 326 on path lid. Since the error inject signal 322 is high, the parity bits are inverted onto path 328. Because latch A 304 is set and latch B 306 is clear, AND gate 332 is driven high active to OR gate 334, which in turn drives the select fine 336 high so that the signals on inputs 1 are selected by selector 310, and driven onto path 312. The inverted parity bits are latched into the eight-word read buffer 161 during phase 1Y1B. In addition, the corrupted parity bits and the corresponding instruction are driven to parity error detect logic 210. A parity error will be detected, so that an error flag associated with the instruction is latched in the error register 212 at phase 1Y1B.

The above-described process will be repeated for every instruction in the eight-word block that is associated with an active flag in the flag register 308. The injected errors will result in instruction re-fetch cycles after the associated corrupted instruction is gated into the F0 register 164a, as was described in detail above.

As mentioned above, during single-shot mode, the error latch 300 remains set for one eight-word instruction block fetch. The error latch 300 does not clear during this period because latch B 306 is clear and the signal "H_Last_Word" 340 is low inactive. Therefore, AND gate 342 drives signal 344 high to NOR gate 346. Signal 348 is driven low to select input 0 of selector 350, which is provided to the error latch 300 on path 352. Thus, the error latch 300 continuously re-latches the high-active error fag on each phase 1A. On the last instruction transfer of the block, however, the signal "H_Last_Word" 340 is driven high-active by one of the interface lines 158b. As a result, NOR gate 346 drives signal 348 high, so that the signal on input 1 of selector 350 is provided to path 352 and the input of error latch 300. Since input 1 of selector 350 is hard-wired low, error latch 300 clears, and parity-error injection is discontinued for subsequent instruction block fetches.

The parity error injection circuit operates in a manner similar to that described above for constant mode, which is selected by scanning high data into both control latches A 304 and B 306.

When both latches A 304 and B 306 are set, and when the signal "H_Memory_Retry" 151 is low inactive, AND gate 352 drives a high signal to OR gate 334 so that inverted parity error data is selected on path 312 as described above. In addition, since control latch B 306 is set, OR gate 346 drives signal 348 low so that error latch 300 remains set. Therefore, during an initial instruction block fetch, corrupted parity data and the associated error flags are latched into the eight-word read buffer 161 and error register 212, respectively, as specified by the flag in flag register 308. As described above, error flags will result in an instruction fetch when the corresponding instruction is gated into the F0 register 164a at phase 1X2A During the re-fetch, however, the signal "H_Memory_Retry" 151 goes high active so that the AND gate 352 drives a low signal to OR gate 334, and inputs 0 are selected by selector 310. The uncorrupted parity bits from the SC 10 are therefore provided to path 312, so that no errors are injected on the instruction re-fetch. By not injecting errors during re-fetch cycles, memory will not be degraded because of a critical error.

Finally, double error mode results when control latch A 304 is clear and latch B 306 is set. In this mode, the error latch 300 remains set because path 348 selects the data on input 0 of selector 352, as discussed above. In addition, AND gate 360 drives a high signal to OR gate 334 so that path 1 of selector 310 is selected, thereby allowing corrupted parity error data to be latched into the eight-word read buffer 161. In this mode, corrupted data is gated to the eight-word read buffer 161 on the initial instruction block fetch, and on the subsequent instruction re-fetch As a result of two parity errors occurring on subsequent instruction fetches, a critical error is generated which results in degradation of the associated instruction second-level cache memory segment.

The parity-error injection system of the present invention allows for extensive testing of the parity error-recovery logic of a pipelined instruction processor. By operating the instruction processor for an extended period with parity-error injection enabled in constant-error mode, recovery logic can be verified for every combination of instructions that may be present within the pipeline when a parity error is detected. Double-error mode can be used to exercise the critical-error detection and memory degradation logic. Single-shot mode can be used to test recovery logic for specific instructions.

Finally, because parity errors can be injected within any instruction word of an eight-word block, all sequences associated with the SC 10 re-fetch logic can be tested.

In addition to providing an error-injection system which comprehensively tests the error detection and recovery logic, the invention provides a means which is also easy to use. Parity errors can be injected by performing just a single scan to initialize the parity injection state devices. Moreover, by correlating the relative addresses from program listings to the bits within the flag register 308, error injection can be performed selectively. For example, a program listing includes the relative addresses of instructions as they are stored within mass storage. When loaded from mass storage into the instruction second level cache 24, the relationship between instructions and the block boundaries will be maintained. Thus, if a listing shows that a specific instruction occupies the first word of an eight-word boundary within mass storage, that instruction will also occupy the first word of a block boundary when loaded into the second-level cache. By setting the flag of the flag register 308 corresponding to the first word in a eight-word block, the user can ensure that parity error injection will occur for that selected instruction. Thus the invention makes parity error injection less time-consuming and error-prone. Moreover, continuous error injection can occur at the normal operating speed of the instruction processor without necessitating any clock manipulation so that the logic is adequately tested.

The parity error injection system described herein is designed to perform parity error injection in the pipelined instruction processor discussed above. However, without further inventive efforts, this error injection system could be adapted to inject parity errors in an instruction resident in any processor within a data processing system. In view of the detailed descriptions and drawings, various modifications or implementations will become apparent to those skilled in the art without departing from the spirit and scope of the invention, and what is described to be protected by Letters Patent is set forth in the appended claims.

What is claimed is:

1. In a data processing system having an instruction processor coupled to a storage system, the instruction processor for retrieving stored instruction from the storage system and for executing the retrieved instructions, the instruction processor further having error detection circuits for providing an error signal in response to detecting a parity error in a corrupted instruction, and retry circuits for causing the instruction processor to discard the corrupted instruction and to again retrieve the discarded instruction from the storage system in response to receiving the error signal, a selectable error-injection system resident with the instruction processor, comprising:

programmable storage means for storing identifiers, each identifier specifying respective predetermined ones of the stored instructions; and corruption means coupled to the storage system and to said programmable storage means for selectively automatically corrupting said predetermined ones of the stored instructions after said predetermined ones of the stored instructions have been retrieved from the storage system.

2. The selectable error-injection system of claim 1 wherein each said identifier specifies predetermined addresses within the storage system.

3. The selectable error-injection system of claim 2 wherein said predetermined addresses are generated by adding a predetermined address offset associated with said identifier to predetermined reference addresses within the storage system.

4. The selectable error-injection system of claim 1 wherein said corruption means may be selectively de-activated when the retry circuits retrieve a discarded instruction from the storage system in response to receiving the error signal.

5. The selectable error-injection system of claim 1 wherein said corruption means further includes circuits for corrupting said predetermined ones of the stored instructions when the retry circuits retrieve a discarded instruction from the storage system in response to receiving the error signal.

6. In a pipelined data processing system having an instruction processor for simultaneously executing a first instruction, decoding a second instruction, and fetching a third instruction from an associated storage system, the instruction processor having error detection circuits for detecting and handling parity errors on the fetched instructions and further having an error injection system for testing the error detection circuits, the instruction processor further having sequencing control circuits for allowing completion of instruction execution on the first instruction and the second instruction for re-fetching the third instruction from the storage system when the error detection circuits detects an error in the third instruction, the error injection system comprising:

programmable storage means for selectively storing a plurality of instruction identifying signals, each of said plurality of instruction identifying signals for specifying respective predetermined ones of the stored instruction; and error injection means coupled to the storage system and to said programmable storage means for automatically injecting parity errors into said respective predetermined ones of the stored instructions after said respective predetermined ones of the stored instructions are fetched from the storage system.

7. The error injection system of claim 6, wherein each of said plurality of instruction identifying signals is for identifying an address offset to be added to one or more reference addresses within the storage system to obtain one or more identifying addresses, each of said identifying address identifying one of said respective predetermined ones of the stored instructions.

8. The error injection system of claim 6, and further comprising mode selection means coupled to said error injection means for selectively enabling said error injection means.

9. The error injection system of claim 8 wherein said mode selection means includes selection means for selectively enabling said error injection means when the sequencing control circuits re-fetch an instruction from the storage system.

10. For use in a data processing system having an instruction processor for executing a predetermined set of machine instructions, and having a storage device for storing predetermined ones of the machine instructions and for providing ones of the stored machine instructions to the instruction processor, and further having parity error detection circuits for detecting a parity error associated with a corrupted one of the machine instructions that has been provided by the storage system to the instruction processor, and further having re-fetch logic circuits for discarding the corrupted one of the machine instructions and for re-fetching it from the storage system, the parity error injection system, comprising:

a programmable storage device to store selector signals indicative of selected ones of the stored machine instructions; and error injection circuits coupled to the storage system, to said programmable storage device, and to the parity error detection circuits, to inject parity errors in said selected ones of the stored machine instructions after said selected ones of the stored machine instructions are provided to the instruction processor, and to provide the corrupted machine instructions to the parity error detection circuits.

11. The parity error injection system of claim 10, wherein said selector signals indicate one or more predetermined address offsets, each offset to be added to one or more predetermined reference addresses within the storage system to obtain selected addresses indicative of said selected ones of the stored machine instructions.

12. The parity error injection system of claim 10, and further including mode selection logic circuits for selectively enabling said error injection circuits.

13. The parity error injection system of claim 12 wherein said mode selection logic circuits include logic for selectively enabling said error injection circuits when the re-fetch logic circuits are activated.

14. In a data processing system having an instruction processor for executing instructions and a first storage system for storing instructions, the instruction processor having a second storage system for storing instructions for later execution which have been fetched from the first storage system, the instruction processor further having data transfer circuits for transferring predetermined blocks of instructions from the first storage system to the second storage system, the instruction processor further having error detection circuits for generating an error signal indicative of a parity error detected in a corrupted instruction fetched from the first storage system, and further having retry circuits for receiving the error signal and in response thereto discarding the corrupted instruction and re-fetching the associated instruction from the first storage system, an error injection system comprising:

programmable storage means for storing flags, each flag being associated with a predetermined range of addresses within the second storage system, and error injection means coupled to the first storage system, to the second storage system, and to said programmable storage means for selectively automatically injecting parity errors into instructions fetched from addresses in the first storage system that are to be stored in addresses within predetermined range of addresses within the second storage system.

15. The error injection system of claim 14, and further including mode selection means coupled to said error injection means for selectively enabling said error injection means.

16. The error injection system of claim 15 wherein said mode selection means includes retry disabling means for selectively disabling said error injection means when the retry circuits re-fetch an instruction from the first storage system.

17. The error injection system of claim 15 wherein said mode selection means includes single-shot means for selectively disabling said error injection means after the data transfer circuits perform a single block transfer from the first storage system to the second storage system.

18. In a data processing system having a first storage device to store data, and an instruction processor to selectively fetch and operate on predetermined units of the data stored in the first storage device, the instruction processor including error checking circuits to check for parity errors in fetched ones of the predetermined units of data, and error notification circuits to signal the occurrence of parity errors, and further including re-fetch logic circuits to re-fetch a predetermined unit of data if a parity error is detected, the instruction processor further including a second storage device, and parity error injection logic circuits coupled to the first storage device and the second storage device, a method of testing the instruction processing means comprising the steps of:

selectively storing error injection indicators in the second storage device wherein each said error injection indicator is indicative of one or more associated predetermined units of data stored in the first storage device;

fetching a selected one of the predetermined units of data from the first storage device;

injecting a parity error in said selected one of the predetermined units of data if said selected one of the predetermined units of data is one of said associated predetermined units of data;

checking said selected one of the predetermined units of data for the presence of a parity error;

re-fetching said selected one of the predetermined units of data from the first storage device if said checking steps indicates the occurrence of a parity error;

checking said selected one of the predetermined units of data for the presence of a parity error;

signaling the occurrence of an error if said second checking step indicates the occurrence of a parity error;

operating on said selected one of the predetermined units of data if said second checking step does not indicate the presence of a parity error; and returning to said fetching step.

19. The method of claim 18 further including after said re-fetching step the step of injecting a parity error in said selected one of the associated predetermined units of data.

* * * * *